Patented Oct. 20, 1936

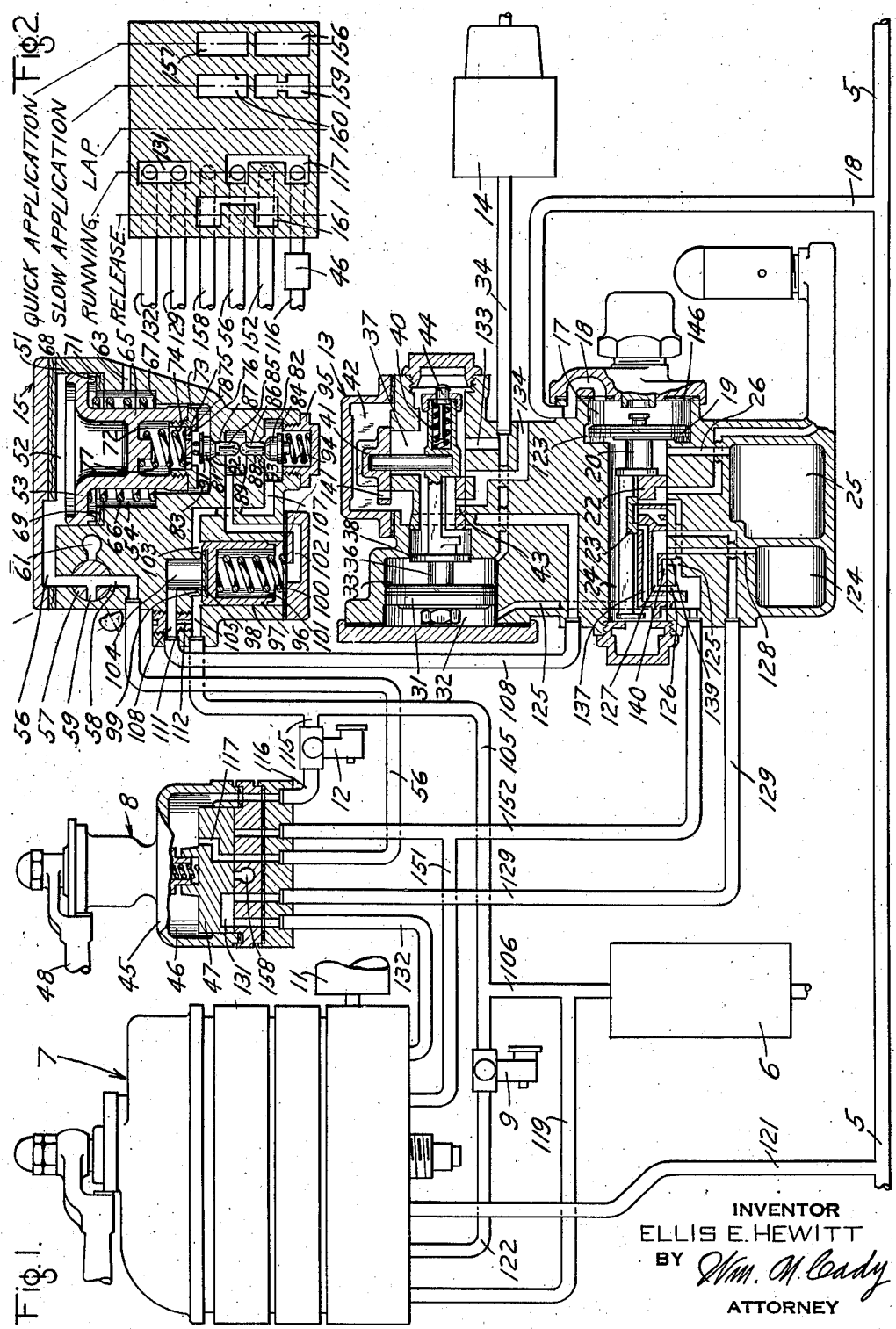

2,058,016

UNITED STATES PATENT OFFICE 2,058,016

FLUID PRESSURE BRAKE

Ellis E. Hewitt, Edgewood, Pa., assignor to The Westinghouse Air Brake Company, Wilmerding, Pa., a corporation of Pennsylvania Application November 20, 1934, Serial No. 753,873

14 Claims. (Cl. 303—40)

This invention relates to fluid pressure brakes, and particularly to the type in which the brakes are applied by effecting a reduction in brake pipe pressure.

As is well known, when the operating handle of the usual brake valve device on a locomotive is turned to a position for effecting a reduction in brake pipe pressure, the brakes on the locomotive and on the cars toward the head end of the train are applied before the brakes on the cars toward the rear end of the train, particularly if the train is a long one, and thus, unless guarded against, the slack in the train runs in, sometimes with considerable shock to the cars.

Various means have been proposed for guarding against or reducing the shock to the cars of a train, caused by the run-in of the slack in the train upon an application of the brakes. Some of the proposed means function generally to delay or hold back the operation of the brake controlling valve device on the locomotive until a predetermined uniform time has elapsed after the initiation of a reduction in brake pipe pressure, so as to delay or hold back the build-up in locomotive brake cylinder pressure a sufficient length of time to permit the momentum or inertia of the locomotive to tend to draw out the slack in the train and thus resist the running in of the slack sufficiently to reduce or prevent harsh running-in of the slack and the consequent shock to the cars.

My present invention is operative to reduce the shock to the cars of a train caused by running-in of slack, upon an application of the brakes on the train, without delaying or holding back the operation of the brake controlling valve device on the locomotive, and includes a choke in the passage, controlled by the brake controlling valve device on the locomotive, through which passage fluid under pressure is supplied to the locomotive brake cylinder, the choke being effective to so limit or restrict the rate of build-up of locomotive brake cylinder pressure, that the application of the brakes on the locomotive occurs at a sufficiently slow rate to prevent or reduce the harsh run-in of slack on the train.

My invention is further adapted to effect the conversion or improvement of existing locomotive equipment to enable it to function so as to prevent or reduce the shock to the cars of the train caused by run-in of slack.

The principal object of my invention is to effect the application of the brakes on the locomotive, upon the initiation of an automatic application of the brakes on the train, in such manner as to prevent harsh run-in of the slack in the train.

A more specific object of my invention is to so restrict or limit the rate of build-up of locomotive brake cylinder pressure, that harsh run-in of slack is prevented or reduced.

Another object of my invention is to provide means which may be connected in associative relation with existing locomotive equipment in a relatively simple manner, to convert or improve the operational characteristics of the equipment so that it may function in such manner as to prevent or reduce harsh run-in of slack in a train of cars.

A further object of my invention is to provide means, for converting existing equipment as above described, which means is adapted to be optionally employed.

A still further object of my invention is to provide means for converting existing equipment as above described, which means functions to restrict or limit the rate of build-up of locomotive brake cylinder pressure to a predetermined uniform maximum rate regardless of the rate of build-up of locomotive brake cylinder pressure permitted by the brake controlling valve device on the locomotive.

The above and other objects and advantages of my invention which will be made apparent hereinafter, are attained by means of an illustrative embodiment described hereinafter and shown in the accompanying drawing, wherein, Figure 1 is a diagrammatic view, mainly in section, of a locomotive brake equipment embodying my invention, and Figure 2 is a development view, showing diagrammatically the connections established in the various positions of the independent brake valve device, shown in Figure 1.

The locomotive brake equipment comprises the usual brake pipe 5, main reservoir 6, automatic brake valve device 7, independent brake valve device 8, feed valve device 9, equalizing reservoir 11, reducing valve device 12, a brake controlling valve device, such as the distributing valve device 13, and a brake cylinder 14.

According to my invention, I provide in addition to the usual equipment above described, a timing valve device 15, which may be optionally employed, for limiting the rate of supply of fluid under pressure from the main reservoir 6 to the brake cylinder 14.

The distributing valve device 13 is of usual construction and comprises a casing containing the usual equalizing portion and application portion. The equalizing portion includes a chamber 17 connected through a passage and pipe 18 to the brake pipe 5 and containing a piston 19 having a stem 20 for operating a main slide valve 22 and an auxiliary slide valve 23, the valves being contained in a slide valve chamber 24 which is constantly in communication with a pressure chamber 25 through a passage 26.

The application portion of the distributing valve device comprises a piston 31 having at one side thereof a chamber 32 and at the other side thereof a chamber 33 which is constantly in communicating with the brake cylinder 14 through a passage and pipe 34. The piston 31 has a stem 36 which extends through the chamber 33 into another chamber 37, the chambers 33 and 37 being separated by a baffle piston 38 mounted on the stem 36. The piston 31 is adapted to operate an application slide valve 41 disposed in a chamber 42, and also an exhaust slide valve 43 disposed in the chamber 37. The end of the stem 36 is provided with the usual graduating stop member 44 which is biased outwardly by a spring 40.

The automatic brake valve device 7, the feed valve device 9, and the reducing valve device 12 are of standard construction and operate in the usual manner. It is deemed unnecessary, therefore, to specifically describe their construction and operation.

The independent brake valve device 8 is substantially of standard construction, except as modified to accomplish the purposes of my invention, in the manner hereinafter described, and comprises briefly a sectional casing 45 having a chamber 46 therein which is continuously in communication with the main reservoir 6 through the reducing valve device 12, and which has therein a rotary valve 47 adapted to be turned to the various brake operating positions in the usual manner by an operating handle 48.

The timing valve device 15 comprises a sectional casing 51 having therein a chamber 52 at one side of a piston 53 and a chamber 54 at the other side of the piston. Chamber 52 is supplied with fluid under pressure through a passage and pipe 56, and a manually operable plug valve 57 is mounted in the casing 51, which valve has a port or passage 58 therein adapted in one position of the plug valve, as shown in Figure 1, to permit the flow of fluid under pressure from the pipe 56 to the chamber 52, and a branch passage or port 59 for connecting the chamber 51 to an atmospheric passage 61 in another position of the plug valve. The valve 57 is thus adapted to cut the timing valve device 15 either in or out of operation, as desired.

The chamber 54 is constantly open to atmosphere through a passage 63 in the casing 51, and has a portion of reduced diameter which portion is adapted to loosely surround and guide the flanged end of a stem 65, preferably integrally formed with the piston 53.

The piston 53 is urged upwardly by a spring 66 in chamber 54, which spring surrounds the stem 65 and is interposed between the lower face of the piston and an annular shoulder 67 formed in the casing 51 at the reduced portion of chamber 54.

Piston 53 is moved downwardly against the resistance of the spring 66 by fluid under pressure acting on the upper face of the piston in chamber 52, the piston being provided with an annular rib 68 on the lower face of the piston, which annular rib engages an annular seat gasket 69 supported on an annular shoulder 71 in the chamber 54 to prevent leakage of fluid under pressure from chamber 52, past the piston 53, into chamber 54 and to atmosphere through the passage 63.

The stem 65 of the piston 53 has a bore or recess 72 formed in the end thereof, into the outer threaded portion of which bore is screwed a screw plug 73 having a bore 74 in which is guided a follower disc 75. The follower disc 75 is urged resiliently outward into engagement with an annular stop shoulder 76, formed at the outer orifice of the bore 74 in the screw plug 73, by a spring 77 interposed between the follower disc 75 and the inner end of the recess 72. The follower disc 75 is provided with suitable perforations or axial openings 78 extending therethrough for preventing dash-pot action by the follower disc as it is moved into the bore 74 of the screw plug against the resistance of the spring 77.

The piston 53 is adapted to operate a pair of oppositely seating valves 81 and 82 disposed, respectively, in chambers 83 and 84, the valves 81 and 82 having fluted stems 85 and 86, respectively, which are guided in suitable bores or passages 87 and 88 in aligned axial relation to meet in end-to-end butting contact within a chamber 89 interposed between chambers 83 and 84. The chamber 83 is in constant communication with the atmosphere, past the loose fitting flanged portion of stem 65, chamber 54, and atmospheric passage 63. In this connection the flanged guide portion of stem 65 may be provided with suitable grooves therein for aiding in establishing the communication from chamber 83 to atmosphere.

The valve 81 has an upstanding stem 91 which is engaged by the follower disc 75, so that when the piston 53 is moved downwardly, the valve 81 is resiliently urged into seated position on a valve seat 92 to cut off communication between chambers 83 and 89 through the bore 87, and the valve 82 is unseated from its corresponding valve seat 93 to open communication between chamber 84 and the chamber 89 through the bore 88.

A spring 94, interposed between valve 82 and a screw plug 95 closing the chamber 84, urges the valves 81 and 82 in a direction to seat the valve 82 and to unseat the valve 81, the tension of the spring 77 being relatively greater than the tension of the spring 94 so as to overcome the resistance offered by spring 94 to the movement of the valves when the piston 53 is moved downwardly into engagement with the gasket seat 69.

The timing valve device 15 further comprises a valve piston 96, operated in a bore 97 in the casing 51, and controlled by variations in fluid pressure acting thereon effected by operation of the valves 81 and 82 in the manner described hereinafter.

The valve piston 96 has a gasket seat 98 suitably secured in the face thereof which is adapted to engage an annular rib seat 99 at one side of the valve piston. The valve piston is urged toward and into engagement with the rib seat 99 by a spring 100 interposed between the valve piston and the casing 51 and disposed in a chamber 101 on the side of the valve piston opposite to the rib seat 99, which chamber is in constant communication with chamber 89, through a passage 102.

When in seated position on the rib seat 99, the valve piston 96 separates an annular chamber 103 opening at the outer seated area of the valve piston and a cylindrical chamber 104 opening at the inner seated area of the valve piston.

The annular chamber 103 is in constant communication with the main reservoir 6 through a passage and pipe 105 and a pipe 106, and is also in constant communication with the valve chamber 84 through a passage 107. The cylindrical chamber 104 is in constant communication with the application valve chamber 42 of the distributing valve device 13 through a passage and pipe 108.

A choke plug 111 is provided, having a restricted passage 112 therein for permitting a by-pass flow of fluid under pressure around the valve piston 96, between the passage 105 leading from the main reservoir 6, and the passage 108 leading to the application valve chamber 42. The purpose of the choke plug 111 is to restrict or limit the rate of flow of fluid under pressure from the main reservoir to the brake cylinder 14, during an application of the brakes, as will be hereinafter described.

With the independent brake valve device 8 in the running position thereof, as shown in Figure 1, and with the plug valve 57 in the position to cut in the timing valve device 15, as shown in Figure 1, fluid under pressure as regulated by the reducing valve device 12 is supplied from the main reservoir 6 to the piston chamber 52 of the timing valve device 15 through pipe 106, pipe 105, branch pipe 115, reducing valve device 12, pipe and passage 116, the rotary valve chamber 46 of the independent brake valve device 8, a passage or port 117 in the rotary valve 47 of the independent brake valve device 8, passage and pipe 56, passage 58 in the plug valve 57, and passage 56. The piston 53 is thus urged downwardly, by the fluid under pressure in chamber 52 acting on the upper face thereof, against the resisting force of spring 66 until the annular rib 68 on the lower face of the piston engages the gasket seat 69, the valve 81 being moved into seated position on its valve seat 92 and the valve 82 being unseated from its valve seat 93. Fluid under pressure from the main reservoir 6 is thus supplied to the chamber 101 at one side of the valve piston 96, through pipe 106, pipe and passage 105, annular chamber 103, passage 107, valve chamber 84, past the unseated valve 82, through the bore 88, chamber 89 and passage 102. The opposing forces exerted by main reservoir pressure acting on opposite sides of the valve piston 96 are thus substantially equalized, and the spring 100 will maintain the valve piston 96 in seating engagement with the annular rib seat 99 to cut off the flow of fluid under pressure from the main reservoir to the application valve chamber 42 past the valve piston 96. Thus the choke plug 111 is effective to permit a by-pass flow of fluid under pressure around the valve piston 96 from the main reservoir to the application valve chamber 42 of the distributing valve device 13 through the restricted passage 112 therein so that the chamber 42 is ultimately charged with fluid at main reservoir pressure.

With the independent brake valve device 8 in running position, the brake pipe 5 is initially charged with fluid under pressure, in the usual manner, by first turning the operating handle of the automatic brake valve device 7 to release position, wherein fluid under pressure from the main reservoir 6 is supplied directly to the brake pipe 5 through pipe 106, branch pipe and passage 119, through the brake valve device 7, and pipe 121, to accelerate the charging of the brake pipe, and then, after a certain time has elapsed, turning the handle of the automatic brake valve device 7 to running position thereof, wherein fluid under pressure is supplied from the main reservoir 6 to the brake pipe 5 through pipe 106, pipe 105, feed valve device 9, pipe and passage 122, through the automatic brake valve device 7, and pipe 121.

Fluid under pressure is supplied from the brake pipe 5, through the usual brake controlling valve devices, not shown, to the auxiliary reservoirs, not shown, on the cars, and from the brake pipe 5, through branch pipe and passage 18 to the equalizing piston chamber 17 of the distributing valve device 13. The pressure of the fluid in chamber 17, acting on the equalizing piston 19, causes the piston 19 and its associated slide valves 22 and 23 to be moved to release position thereof, as shown in Figure 1, wherein the usual feed groove 123 around the equalizing piston 19 is uncovered. Fluid at brake pipe pressure is then supplied from piston chamber 17 through feed groove 123 to the equalizing slide valve chamber 24, and from the slide valve chamber 24 to the pressure chamber 25 through passage 26.

In the release position of the equalizing main slide valve 22 and auxiliary slide valve 23, the application piston chamber 32 and an application chamber 124, provided for enlarging the capacity of the application piston chamber, are connected together through a passage 125, a port 126 opening out of passage 125 at the seat of main slide valve 22, a cavity 127 in the main slide valve, and a passage 128. Also, with the automatic brake valve device 7 in running position, both the application piston chamber 32 and the application chamber 124 are connected to atmosphere, through a pipe and passage 129 opening at the seat of the main slide valve 22 and in communication with the cavity 127 in the slide valve 22 in the release position of the slide valve 22, a cavity 131 in the rotary valve 47 of the independent brake valve device 8, passage and pipe 132, and through the usual connections and atmospheric port of the automatic brake valve device 7.

In the release position of the application piston 31, the locomotive brake cylinder 14 is vented to atmosphere through pipe and passage 34, a branch passage 133 opening into valve chamber 37, and an atmospheric passage 134 leading out of the valve chamber 37 and controlled by the exhaust slide valve 43.

*Service application*

Upon a reduction in brake pipe pressure at a service rate, effected in the usual manner by means of the automatic brake valve device 7, with the timing valve device 15 cut in as above described and with the independent brake valve device 8 in running position thereof, the equalizing piston and valve device moves out to service position in the usual manner and fluid under pressure is supplied from the pressure chamber 25 and slide valve chamber 24 to the application piston chamber 32 through the service port 137 in the main slide valve 22 and passage 125, and also from passage 125 to the application chamber 124 through the cavity 140 in the main slide valve 22.

Thus the pressure of fluid in application piston chamber 32 is gradually increased, in the usual manner, and the application piston and slide valve device is moved out to service position, wherein exhaust valve 43 cuts off the communication of brake cylinder 14 to atmosphere through passage 134, and the application slide valve 41 is positioned so that the port 141 therein establishes communication between the application slide valve chamber 42 and the valve chamber 37. Fluid under pressure is then supplied from the main reservoir 6 to the brake cylinder 14, to effect a service application of the brakes, through pipe 106, pipe and passage 105, restricted passage 112 in the choke plug 111, passage and pipe 108, valve chamber 42, port 141 in the slide valve 41, valve chamber 37, passage 133 and passage and pipe 34.

When the further supply of fluid under pressure to the application piston chamber 32 and the application chamber 124 is cut off at the seat of the auxiliary slide valve 23, in the usual manner, upon reduction of pressure of the fluid in pressure chamber 25 and slide valve chamber 24 below that in equalizing piston chamber 17 and the consequent movement of the equalizing piston and slide valve device to lap position, further increase in pressure in the application piston chamber 32 ceases.

When the pressure in chamber 33 at the right of application piston 31 has been increased in accordance with the increase in brake cylinder pressure, to a degree exceeding the pressure in the application piston chamber 32, the piston 31 is shifted to lap position with the assistance of the graduating spring 40, in the usual manner, the brakes being thus held applied in the attained degree of brake cylinder pressure.

If it is desired to apply the brakes with greater force, a further reduction in brake pipe pressure may be made by means of the automatic brake valve device 7, in the usual manner.

Ordinarily, in effecting a service application of the brakes, the flow of fluid under pressure from the main reservoir 6 to the locomotive brake cylinder 14 will be controlled and regulated by the extent of opening of port 141 in the application slide valve 41 in accordance with the rate at which the pressure in the application piston chamber 32 is increased, the restricted passage 112 in the choke plug 111 being of sufficient flow area to supply fluid under pressure therethrough at the rate as permitted by the port 141. However, if the port 141 is opened to an extent such that the flow area thereof exceeds the flow area of the restricted port 112, then the rate of flow of fluid under pressure to the brake cylinder will be limited by the restricted port 112 in the choke plug 111.

*Release after service application*

If it is desired to release the brakes on the train after a service application of the brakes, the operating handle of the automatic brake valve device 7 may be turned, in the usual manner, first to release position where it is held momentarily to accelerate the charging of the brake pipe, and then to running position. Inasmuch as the brake equipment on the cars and the locomotive brake equipment operate in the usual manner to effect a release of the brakes on the cars and on the locomotive, it is deemed unnecessary to specifically describe the operation of the equipment for this type of release of the brakes.

*Emergency application*

If it is desired to effect an emergency application of the brakes on the train, the operating handle of the automatic brake valve device 7 is turned to emergency position thereof and left there, a reduction in brake pipe pressure at an emergency rate being thereby effected, in the usual manner.

The brake controlling valve devices on the cars of the train operate in the usual manner in response to a reduction in brake pipe pressure at an emergency rate, to effect an emergency application of the brakes on the cars.

The sudden rapid emergency reduction in the pressure of fluid in the equalizing piston chamber 17, causes the equalizing piston and slide valve device to be suddenly and rapidly moved to the right, by the higher pressure in the pressure chamber 25 and slide valve chamber 24, into the emergency position thereof wherein the piston seats against the end cover gasket 146 and the left edge of the main slide valve 22 uncovers the port 126. Since the cavity 140 in the main slide valve 22 is out of registry with the port 139 opening at the seat of the main slide valve 22, in the emergency position of the main slide valve, fluid under pressure is supplied from pressure chamber 25 only to the application piston chamber 32, past the end of the main slide valve through port 126 and passage 125, so that the pressure within the application piston chamber 32 is very suddenly and rapidly built up.

Upon the sudden rapid build-up of pressure in the application piston chamber 32, the application piston 31 is suddenly and rapidly moved into emergency position, wherein the application slide valve 41 is positioned to establish communication between the application slide valve chamber 42 and the valve chamber 37 through the port 141 therein. Fluid under pressure is then supplied from the main reservoir 6 to the locomotive brake cylinder 14 in the same manner as previously described for a service application of the brakes.

Since the application piston 31 is moved to open the port 141 in the application slide valve 41 to an extent corresponding with the rate at which the pressure in the application piston chamber 32 is increased, the extent of opening of the port 141 in an emergency application of the brakes is such that the flow area thereof exceeds the flow area of restricted port 112, and thus the rate of flow of fluid under pressure to the brake cylinder is limited by the restricted port 112 in the choke plug 111.

The flow area of the restricted passage 112 of the choke plug 111 is calculated to cause such a limited or restricted rate of build-up of pressure in the locomotive brake cylinder, during an emergency application of the brakes, that the rate of retardation of the locomotive relative to the rate of retardation of the cars of the train is not rapid enough to cause harsh running-in of the slack in the train, the momentum or inertia of the locomotive tending to draw out the slack in the train.

When the pressure in the chamber 33 at the right of the application piston 31 has been increased in accordance with the increase in the locomotive brake cylinder pressure to a degree slightly exceeding the pressure in the application piston chamber 32, the piston 31 is shifted in the usual manner to the lap position thereof to maintain the brakes on the locomotive applied.

*Release after emergency application*

To effect a release of the brakes on the train, after an emergency application thereof, the operating handle of the automatic brake valve device 7 is turned the same as in releasing the brakes after a service application, that is it is turned to release position, held there momentarily, then turned to running position. Inasmuch as the braking equipment operates in the usual manner to effect release of the brakes after an emergency application, it is deemed unnecessary to include herein a description of this operation.

*Independent operation of the locomotive brakes*

The locomotive brakes may be independently operated by means of the independent brake valve device 8, in the usual manner, and it is therefore deemed unnecessary to specifically describe the operation of the locomotive brake equipment in this connection, except insofar as the operation of the independent brake valve device 8 affects the timing valve device 15.

With the handle 48 of the independent brake valve device 8 in quick application position, the rotary valve 47 is positioned to connect the pipe and passage 56 to atmospheric exhaust port 158 through a cavity 157 in the rotary valve 47, and to connect the pipe and passage 152 to the rotary valve chamber 46 through a port 156 in the rotary valve 47 (see Figure 2).

Fluid under pressure is thus vented from the piston chamber 52 of the timing valve device 15 to atmosphere, through passage 56, passage 58 in the plug valve 57, passage and pipe 56, cavity 157 in the rotary valve 47, and exhaust passage 158. Spring 66 then moves the piston 53 upwardly, and the spring 94 is effective to seat the valve 82 on its valve seat 93 and to unseat the valve 81 from its seat 92. Fluid under pressure is thus exhausted from the chamber 101, beneath the valve piston 96, to atmosphere through passage 102, chamber 89, bore 87, past the unseated valve 81, chamber 83, past the loose-fitting flange on the piston stem 65 into chamber 54, and thence through atmospheric passage 63. The supply of fluid under pressure to the chamber 101 being cut off by the seating of valve 82 on its seat, main reservoir pressure acting on the upper face of the valve piston 96 overcomes the resistance of the spring 109 and unseats valve piston 96 from the annular rib seat 99.

Thus when the application piston and slide valve device is operated to application position by fluid supplied from the reducing valve device 12 to application piston chamber 32, through pipe and passage 116, rotary valve chamber 46, port 156 in the rotary valve 47, passage and pipe 152, and passage 125, fluid under pressure supplied from the main reservoir 6 to the locomotive brake cylinder 14 flows through the relatively unrestricted by-pass communication around the choke plug 111, past the unseated valve piston 96, the extent of opening of the port 141 in the application slide valve 41 alone determining the rate of build-up of brake cylinder pressure in accordance with the rate of build-up of pressure in the application piston chamber 32.

With the operating handle 48 of the independent brake valve device 8 in slow application position, the rotary valve 47 is so positioned that a restricted passage 159 therein connects the rotary valve chamber 46 to the pipe and passage 152 and a cavity 160 therein connects pipe and passage 56 to the atmospheric exhaust passage 158.

Thus the choke plug 111 is rendered ineffective to limit the rate of flow of fluid under pressure to the brake cylinder, in the same manner as previously described for the quick application position of the rotary valve, the rate of supply of fluid under pressure to the application piston chamber 32 being, however, at a slower rate than for an independent quick application of the brakes due to the restriction of the passage 159, so that the build-up of locomotive brake cylinder pressure for an independent slow application of the brakes is effected at a rate slower than that for an independent quick application of the brakes.

*Cut out of timing valve device*

If, with the equipment conditioned as shown in Figure 1, it is desired to cut out the timing valve device 15, the plug valve 57 is manually operated so as to vent the piston chamber 52 to atmosphere through passage 56, passages 58 and 59 in the plug valve 57 and the atmospheric exhaust passage 61. The spring 66 thus moves the piston 53 upwardly so that the spring 94 is effective to seat the valve 82 and unseat the valve 81, which results in the unseating of the valve piston 96, in the same manner as previously described in connection with the independent operation of the locomotive brakes. Since the valve piston 96 is unseated, the choke plug 111 is ineffective to determine or limit the rate of build-up of pressure in the locomotive brake cylinder 14, and thus the equipment is in condition to operate in all respects in the usual manner.

*Summary*

Summarizing, the apparatus comprising my invention includes the usual locomotive brake equipment, having an automatic brake valve device, an independent brake valve device, and a distributing valve device, and in addition to the usual locomotive brake equipment a timing valve device constructed and operating according to my invention, in connection with the locomotive brake equipment.

The timing valve device is adapted to be cut in or out of operation by a manually operable valve and comprises a choke plug having a restricted passage through which fluid is supplied from the main reservoir to the locomotive brake cylinder upon an application of the brakes. A valve piston controlling a relatively unrestricted by-pass communication around the choke plug is adapted to open the communication and thereby render the choke plug ineffective when the timing valve device is cut out of operation or when the independent brake valve device is operated out of the running position thereof. Thus, with the independent brake valve device in running position, when the automatic brake valve device is operated to effect an application of the brakes, the choke plug is effective to restrict the rate of flow of fluid under pressure from the main reservoir to the locomotive brake cylinder and consequently to restrict the rate of build-up of locomotive brake cylinder pressure to a limited maximum rate, regardless of the rate permitted by the distributing valve device, so that harsh run-in of slack in the train is prevented or reduced by the tendency of the locomotive to draw out the slack.

The choke plug is most effective during an emergency application of the brakes, when the distributing valve device calls for a higher rate of flow of fluid under pressure to the locomotive brake cylinder than that permitted by the choke plug passage, but may be effective during a service application of the brakes, if the distributing valve device is so operated as to call for a higher rate of flow of fluid under pressure to the locomotive brake cylinder than that permitted by the choke plug.

When the independent brake valve device is operated out of running position into either quick application or slow application position, the valve piston is operated to open the by-pass communication around the choke plug so that the choke plug is rendered ineffective to restrict or limit the rate of build-up of locomotice brake cylinder pressure during an independent application of the locomotive brakes.

It will be seen, therefore, that by means of my invention, existing locomotive brake equipment may be converted or modified so as to function to prevent or reduce harsh running-in of slack in the train upon an application of the brakes. All that is necessary to convert or modify existing locomotive brake equipment is the addition of a timing valve device constructed and operating according to my invention, the modification of the independent brake valve device to include necessary ports and passages, and the changing of a few pipe connections, and thus existing equipment may be converted in a relatively simple and inexpensive manner.

While but one embodiment of my invention is shown and described, it should be understood that my invention may be modified by various changes, omissions or additions without departing from the spirit thereof, and that therefore, it is not my intention to limit the scope of my invention except as necessitated by the prior art and as defined in the appended claims.

Having now described my invention, what I claim as new and desire to secure by Letters Patent, is:

1. In a locomotive fluid pressure brake, the combination with a brake pipe, a brake cylinder, an independent brake valve device, and a brake controlling valve device operable, upon a reduction in brake pipe pressure or in response to the operation of said independent brake valve device to a brake application position, to cause fluid under pressure to be supplied to the brake cylinder to effect an application of the brakes, of means effective to restrict the rate of flow of fluid under pressure to the brake cylinder to a limited maximum rate, and means for rendering said rate restricting means effective upon a reduction in brake pipe pressure and for rendering said rate restricting means ineffective, upon operation of said independent brake valve device to effect an application of the brakes.

2. In a locomotive fluid pressure brake, the combination with a brake pipe, a brake cylinder, an independent brake valve device, and a brake controlling valve device operable, upon a reduction in brake pipe pressure or in response to the operation of said independent brake valve device to a brake application position, to cause fluid under pressure to be supplied to the brake cylinder to effect an application of the brakes, of means controlled by said independent brake valve device and effective to restrict the rate of flow of fluid under pressure to the brake cylinder to a limited maximum rate.

3. In a locomotive fluid pressure brake, the combination with a brake pipe, a brake cylinder, an independent brake valve device, and a brake controlling valve device operable, upon a reduction in brake pipe pressure or in response to the operation of said independent brake valve device to a brake application position, to cause fluid under pressure to be supplied to the brake cylinder to effect an application of the brakes, of means effective to restrict the rate of flow of fluid under pressure to the brake cylinder to a limited maximum rate, and means controlled by said independent brake valve device for rendering said rate restricting means ineffective.

4. In a locomotive fluid pressure brake, the combination with a brake pipe, a brake cylinder, an independent brake valve device, and a brake controlling valve device operable, upon a reduction in brake pipe pressure or in response to the operation of said independent brake valve device to a brake application position, to cause fluid under pressure to be supplied to the brake cylinder to effect an application of the brakes, of means effective to restrict the rate of flow of fluid under pressure to the brake cylinder to a limited maximum rate, when said independent brake valve device is in the normal position thereof, and means for rendering said rate restricting means ineffective when said independent brake valve device is in an application position thereof.

5. In a locomotive fluid pressure brake, the combination with a brake pipe, a brake cylinder, and a brake controlling valve device operable upon a reduction in brake pipe pressure to cause fluid under pressure to be supplied to said brake cylinder to effect an application of the brakes, of means effective to restrict the rate of flow of fluid under pressure to the brake cylinder to a limited maximum rate, and an independent brake valve device operable to a position to cause said brake controlling valve device to operate to effect an application of the brakes, said independent brake valve device being adapted while in a brake application position thereof to render said rate restricting means ineffective and while in the normal position thereof to render said rate restricting means effective.

6. In a locomotive fluid pressure brake, the combination with a brake pipe, a brake cylinder, an independent brake valve device, and a brake controlling valve device operable, upon a reduction in brake pipe pressure or in response to the operation of said independent brake valve device to a brake application position, to cause fluid under pressure to be supplied to the brake cylinder to effect an application of the brakes, of means effective to restrict the rate of flow of fluid under pressure to the brake cylinder to a limited maximum rate, and means controlled by said independent brake valve device and operable to open and close a communication through which fluid under pressure may be supplied to the brake cylinder at a rate faster than that permitted by said rate restricting means.

7. In a locomotive fluid pressure brake, the combination with an automatic brake valve device, an independent brake valve device, a brake cylinder, and a brake controlling valve device operable to cause fluid under pressure to be supplied to said brake cylinder to effect an application of the brakes in response to the operation of either said automatic brake valve device or said independent brake valve device to a brake application position, of means effective to restrict the rate of flow of fluid under pressure to the brake cylinder to a limited maximum rate, and means for rendering said rate restricting means effective when said automatic brake valve device is operated to effect an application of the brakes, and for rendering said rate restricting means ineffective when said independent brake valve device is operated to effect an application of the brakes.

8. In a locomotive fluid pressure brake, the combination with an automatic brake valve device, an independent brake valve device, a brake cylinder, and a brake controlling valve device operable to cause fluid under pressure to be supplied to said brake cylinder to effect an application of the brakes in response to the operation of either said automatic brake valve device or said independent brake valve device to a brake application position, of means controlled by said independent brake valve device and effective to restrict the rate of flow of fluid under pressure to the brake cylinder to a limited maximum rate upon operation of said automatic brake valve device to a brake application position.

9. In a fluid pressure brake, the combination with a brake pipe, a reservoir, and a brake controlling valve device operative upon a reduction in brake pipe pressure to cause fluid under pressure to be supplied from said reservoir through a communication at a certain rate for effecting an application of the brakes, of choke means in said communication effective to limit the rate of flow of fluid under pressure through said communication to a rate less than the certain rate, and fluid pressure responsive means subject on opposite sides to fluid under pressure supplied from said reservoir for rendering said choke means effective and operative upon a reduction in the pressure of fluid on one side thereof to render said choke means ineffective.

10. In a fluid pressure brake, the combination with a brake pipe, a reservoir, and a brake controlling valve device operative upon a reduction in brake pipe pressure to cause fluid under pressure to be supplied from said reservoir through a communication at a certain rate for effecting an application of the brakes, of choke means in said communication effective to limit the rate of flow of fluid under pressure through said communication to a rate less than the certain rate, fluid pressure responsive means subject on opposite sides to fluid under pressure supplied from said reservoir for rendering said choke means effective and operative upon a reduction in the pressure of fluid on one side thereof to render said choke means ineffective, and manually controlled means operative to control the supply of fluid under pressure from said reservoir to the said one side of said fluid pressure responsive means and the release of fluid under pressure from the said one side of the fluid pressure responsive means.

11. In a fluid pressure brake, the combination with a brake pipe, a reservoir, a brake cylinder, and a brake controlling valve device operative upon a reduction in brake pipe pressure to cause fluid under pressure to be supplied from said reservoir to said brake cylinder at a certain rate to effect an application of the brakes, of choke means through which the fluid under pressure is supplied to the brake cylinder effective to limit the rate of flow of fluid under pressure to the brake cylinder to a rate less than the certain rate, and fluid pressure responsive means subject on opposite sides to fluid under pressure supplied from said reservoir for rendering said choke means effective and operative upon a reduction in the pressure of fluid on one side thereof to render said choke means ineffective.

12. In a fluid pressure brake, the combination with a brake pipe, a reservoir, a brake cylinder, and a brake controlling valve device operative upon a reduction in brake pipe pressure to cause fluid under pressure to be supplied from said reservoir to said brake cylinder at a certain rate to effect an application of the brakes, of choke means through which the fluid under pressure is supplied to the brake cylinder effective to limit the rate of flow of fluid under pressure to the brake cylinder to a rate less than the certain rate, fluid pressure responsive means subject on opposite sides to fluid under pressure supplied from said reservoir for rendering said choke means effective and operative upon a reduction in the pressure of fluid on one side thereof to render said choke means ineffective, and manually controlled means operative to control the supply of fluid under pressure from said reservoir to the said one side of said fluid pressure responsive means and the release of fluid under pressure from the said one side of the fluid pressure responsive means.

13. In a fluid pressure brake, the combination with a brake pipe, a brake cylinder, and a brake controlling valve device operative upon a gradual reduction in brake pipe pressure to cause fluid under pressure to be supplied to said brake cylinder at a certain rate to effect a service application of the brakes, and operative upon a sudden reduction in brake pipe pressure to cause fluid under pressure to be supplied to said brake cylinder at a different rate in excess of the certain rate to effect an emergency application of the brakes, of choke means through which the fluid under pressure is supplied to the brake cylinder effective to restrict the rate of flow of fluid under pressure to the brake cylinder to a limited maximum rate in excess of said certain rate but less than said different rate.

14. In a locomotive fluid pressure brake, the combination with a brake pipe, an independent brake valve device, and a brake controlling valve device operable, upon a reduction in brake pipe pressure or in response to the operation of said independent brake valve device to a brake application position, to cause fluid under pressure to be supplied through a communication for effecting an application of the brakes, of means controlled by said independent brake valve device and effective to restrict the rate of flow of fluid under pressure through the said communication to a limited maximum rate.

ELLIS E. HEWITT.